(12) United States Patent
Masuda et al.

(10) Patent No.: US 8,036,482 B2
(45) Date of Patent: Oct. 11, 2011

(54) IMAGE PROCESSING APPARATUS AND METHOD, PROGRAM, AND RECORDING MEDIUM

(75) Inventors: Takashi Masuda, Tokyo (JP); Toshihide Nakane, Kanagawa (JP); Yoshiharu Saiki, Tokyo (JP); Hidetaka Takuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 918 days.

(21) Appl. No.: 12/026,598

(22) Filed: Feb. 6, 2008

(65) Prior Publication Data

US 2008/0193042 A1 Aug. 14, 2008

(30) Foreign Application Priority Data

Feb. 9, 2007 (JP) .................................. 2007-031018

(51) Int. Cl.
*G06K 9/40* (2006.01)
(52) U.S. Cl. ...................................................... 382/255
(58) Field of Classification Search .................. 345/647; 348/E3.043, E5.076; 382/255, 275
See application file for complete search history.

(56) References Cited

FOREIGN PATENT DOCUMENTS

| JP | 2000-209569 | 7/2000 |
|---|---|---|
| JP | 2000-324386 | 11/2000 |
| JP | 2004-272578 | 9/2004 |
| JP | 2008141568 A * | 6/2008 |

OTHER PUBLICATIONS

Japanese Office Action issued on Dec. 16, 2008, corresponding to JP Patent App. No. 2007-031018.

* cited by examiner

*Primary Examiner* — Gregory F Cunningham
(74) *Attorney, Agent, or Firm* — SNR Denton US LLP

(57) ABSTRACT

Disclosed herein is an image processing apparatus including, a distortion correction processor for generating a distortion-corrected output image from a distorted wide-field-of-view image, and a selected area setting unit for setting a selected area in the output image, wherein the distortion correction processor corrects a distortion with a lower image quality when an output image of an area exclusive of the selected area is generated than when an output image of the selected area is generated.

8 Claims, 13 Drawing Sheets

IMAGE PROCESSING APPARATUS AND METHOD, PROGRAM, AND RECORDING MEDIUM

CROSS REFERENCES TO RELATED APPLICATIONS

The present invention contains subject matter related to Japanese Patent Application JP 2007-031018 filed in the Japan Patent Office on Feb. 9, 2007, the entire contents of which being incorporated herein by reference.

BACKGROUND OF THE INVENTION

1. Field of the Invention

The present invention relates to an image processing apparatus and method, a program, and a recording medium, and more particularly to the art of correcting a distortion with a lower image quality when an image of an area exclusive of a selected area is generated than when an image of the selected area is generated, at the time a distortion-corrected output image is generated from a distorted image in a wide field of view.

2. Description of the Related Art

Heretofore, there has been proposed an apparatus for letting the user designate a required area in an image in a wide field of view that has been captured using a fisheye lens, for example, correcting a distortion of the designated area, and displaying the corrected image (see Japanese Patent Laid-open No. 2000-324386).

SUMMARY OF THE INVENTION

If the distortion of the designated area is corrected for each frame to generate a corrected image signal, then the distortion correcting process is a time-consuming task. Therefore, even if the captured image signal is read at a high rate, it is difficult to generate a corrected image signal at a high frame rate.

It is an embodiment of the present invention to provide an image processing apparatus and method, a program, and a recording medium which are capable of generating a distortion-corrected image signal at a high frame rate.

According to principles of the present invention, for generating a distortion-corrected output image from a distorted wide-field-of-view image, a distortion is corrected with a lower image quality when an output image of an area exclusive of a selected area is generated than when an output image of the selected area is generated.

An image processing apparatus according to an embodiment of the present invention includes a distortion correction processor for generating a distortion-corrected output image from a distorted wide-field-of-view image, and a selected area setting unit for setting a selected area in the output image, wherein the distortion correction processor corrects a distortion with a lower image quality when an output image of an area exclusive of the selected area is generated than when an output image of the selected area is generated.

An image processing method, a program, and a recording medium according to another embodiment of the present invention include the steps of setting a selected area in an output image, and correcting a distortion with a lower image quality when an output image of an area exclusive of the selected area is generated than when an output image of the selected area is generated.

According to yet another embodiment of the present invention, a distortion is roughly corrected on the output image which is set in its entirety as the area exclusive of the selected area, and thereafter the output image of the selected area is generated. For correcting the distortion with the lower image quality, pixel positions in the wide-field-of-view image which correspond to pixels in the output image are calculated at the interval of every other pixel or the interval of every plural pixels, and a mapping process is performed for using pixel signals at the calculated positions as signals of corresponding pixels in the output image, for thereby generating the distortion-corrected output image from the distorted wide-field-of-view image. In the selected area, the mapping process is performed on each pixel to generate the distortion-corrected output image from the distorted wide-field-of-view image. The pixel signals of the pixels which are processed by the mapping process may be used as pixel signals of pixels which are not processed by the mapping process. Alternatively, pixel signals of pixels which are disposed adjacent to the pixels in the wide-field-of-view image from which the pixel signals are read by the mapping process are used as pixel signals of pixels which are not processed by the mapping process.

According to yet another embodiment of the present invention, for generating the distortion-corrected output image from the distorted wide-field-of-view image, the distortion is corrected more roughly when the image of the area exclusive of the selected area is generated than when the image of the selected area is generated. Therefore, the amount of calculation for generating the output image is reduced, and the output image can be generated at a high frame rate.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
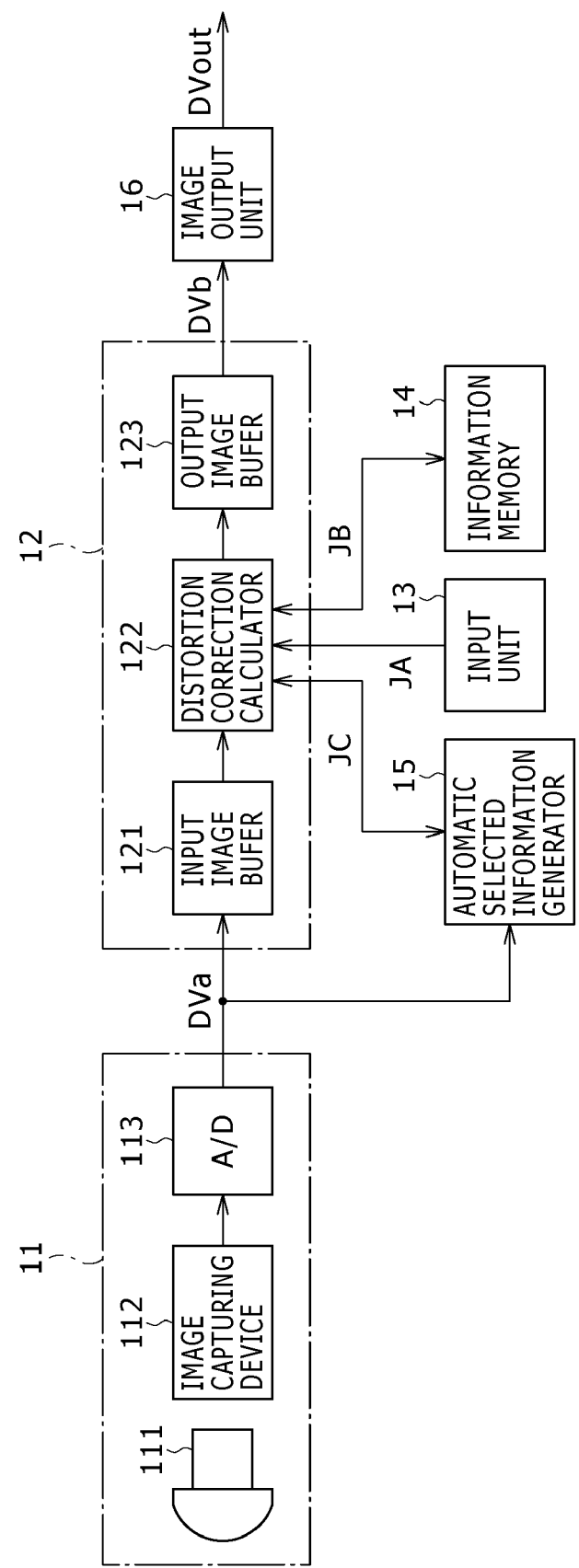
FIG. 1 is a block diagram of a camera system incorporating an image processing apparatus according to the present invention.

Preferred embodiments of the present invention will be described below with reference to the drawings. FIG. 1 shows in block form a camera system incorporating an image processing apparatus according to the present invention.

As shown in FIG. 1, the camera system includes an image capturing unit 11, a distortion correction processor 12, an input unit 13, an information memory 14, an automatic selected information generator 15, and an image output unit 16.

The image capturing unit 11 includes an image capturing optical system 111, an image capturing device 112, and an A/D converter 113. The image capturing optical system 111 is used to focus a subject image onto an image capturing surface of the image capturing device 112. Specifically, the image capturing optical system 111 includes a fisheye lens for focusing a subject image in a wide field of view onto the image capturing surface of the image capturing device 112. Alternatively, the image capturing optical system 111 may include a wide-angle lens, a PAL (Panoramic Annular Lens), or the like, for example, instead of a fisheye lens. Further alternatively, the image capturing optical system 111 may include a tubular, cup-shaped, or conical mirror for reflecting a subject image in a wide field of view as a focused image onto the image capturing surface of the image capturing device 112, or may include a combination of lenses and mirrors for capturing an image in a wider field of view.

The image capturing device 112 includes a CCD (Charge-Coupled Device), a CMOS (Complementary Metal-Oxide Semiconductor) sensor, or the like for converting light into an electric signal. An analog image signal generated by the image capturing device 112 is converted by the A/D converter 113 into a digital image signal, which is supplied to the input image buffer 121 in the distortion correction processor 12.

The distortion correction processor 12 includes an input image buffer 121, a distortion correction calculator 122, and an output image buffer 123. The distortion correction processor 12 generates a distortion-corrected output image from a wide-angle-of-view image that is obtained by the image capturing unit 11. Specifically, the distortion correction processor 12 performs a mapping process for calculating pixel positions on the wide-angle-of-view image which correspond to respective pixels of an output image, and using pixel signals at the calculated pixel positions as signals of the corresponding pixels of the output image.

The input image buffer 121 holds pixel signals of a wide-angle-of-view image supplied from the image capturing unit 11. The output image buffer 123 holds a distortion-corrected output image by successively writing pixel signals that are read from the input image buffer 121 as the distortion correction calculator 122 performs the mapping process. The distortion correction calculator 122 calculates pixel positions on the wide-angle-of-view image which correspond to respective pixels of an output image.

The distortion correction calculator 122 is connected to the input unit 13, the information memory 14, and the automatic selected information generator 15. The input unit 13 receives an operation input for making panning, tilting, and zooming actions to change the range of an output image with respect to a wide-angle-of-view image, and also receives an operation input for setting a selected area in an output image.

The selected area is an area of the output image which is corrected in distortion to provide a better image quality than an area of the output image which is exclusive of the selected area (hereinafter referred to as "unselected area"). The unselected area is an area provided to shorten a calculation time required for distortion correction, and allows an image quality thereof to be lower than the selected area.

The selected area is not limited to any particular shapes. However, if the selected area is of a shape which allows the distortion correction calculator 122 to easily determine whether an image is an image included in the selected area or not, then the selected area of such a shape facilitates the distortion correcting process of the distortion correction calculator 122. For example, if the selected area is of a rectangular shape, then the selected area can uniquely be determined when the pixel positions of the left corners of the rectangular shape, the width of the rectangular shape (the number of pixels in the horizontal direction), and the height of the rectangular shape (the number of pixels in the vertical direction) are specified, allowing the distortion correction calculator 122 to easily determine whether an image is an image included in the selected area or not. If the selected area is of a circular shape, then the selected area can uniquely be determined when the pixel position of the center of the circular shape and the size of the radius or diameter of the circular shape are specified, allowing the distortion correction calculator 122 to easily determine whether an image is an image included in the selected area or not.

Parameters for setting the selected area are entered by the user through the input unit 13. Alternatively, a setting screen may be displayed for setting a selected area, and the user may designate a selected area on the displayed setting screen to determine parameters. The parameters are supplied as setting information JA to the distortion correction calculator 122.

The information memory 14 serves to store parameters for setting the range of an output image selected by panning, tilting, and zooming actions, and also parameters for setting a selected area in an output image. The information memory 14 may store parameters of one or more selected areas, and desired parameters may be read from the information memory 14 and supplied as setting information JB to the distortion correction calculator 122 for setting a selected area.

The automatic selected information generator 15 automatically sets a selected area. Specifically, the automatic selected information generator 15 compares a plurality of frame images using an image signal DVa to detect an area in which a motion has occurred. Then, the automatic selected information generator 15 automatically sets a selected area containing the area in which the motion has occurred, and supplies parameters representing the selected area as set information JC to the distortion correction calculator 122. Alternatively, the automatic selected information generator 15 may detect an area in which a color change or a luminance change has occurred, and may automatically set a selected area containing such a detected area.

The camera system may include either one or all of the input unit 13, the information memory 14, and the automatic selected information generator 15 for setting a selected area.

The distortion correction calculator 122 corrects a distortion with a lower image quality when a distortion-corrected image of an unselected area is generated from a distorted image in a wide field of view, than when an image of a selected area is generated. Specifically, when an image of an unselected area is generated, the distortion correction calculator 122 performs a mapping process for calculating pixel positions on a wide-angle-of-view image which correspond to respective pixels of an output image, and using pixel signals at the calculated pixel positions as signals of the corresponding pixels of the output image, at the interval of each pixel or the intervals of a plurality of pixels, for thereby correcting a distortion with a lower image quality. The distortion correction calculator 122 writes the pixel signals that are read from the input image buffer 121 according to the mapping process successively into the output image buffer 123 to store a distortion-corrected output image in the output image buffer 123.

The image output unit 16 outputs the image signal read from the output image buffer 123 of the distortion correction processor 12 to a display device (not shown) which displays a corresponding image, the image signal being converted into an image signal DVout in an output format compatible with the display device.

The distortion correction processor 12, the distortion correction calculator 122, etc. may be either hardware-implemented or software-implemented.

The principles of the distortion correcting process will be described below. The distortion correcting process for correcting an image distortion produced by the image capturing optical system 111 employs a geometrical correcting process based on a general algorithm for converting a distorted two-dimensional coordinate system into a distortion-free two-dimensional orthogonal coordinate system, for example. Conversion formulas and conversion tables of the algorithm may be stored in a ROM, another memory, or the like. The distortion correcting process is not limited to such a geometrical correcting process, but may be any of other known distortion correcting processes.

Figure 2:
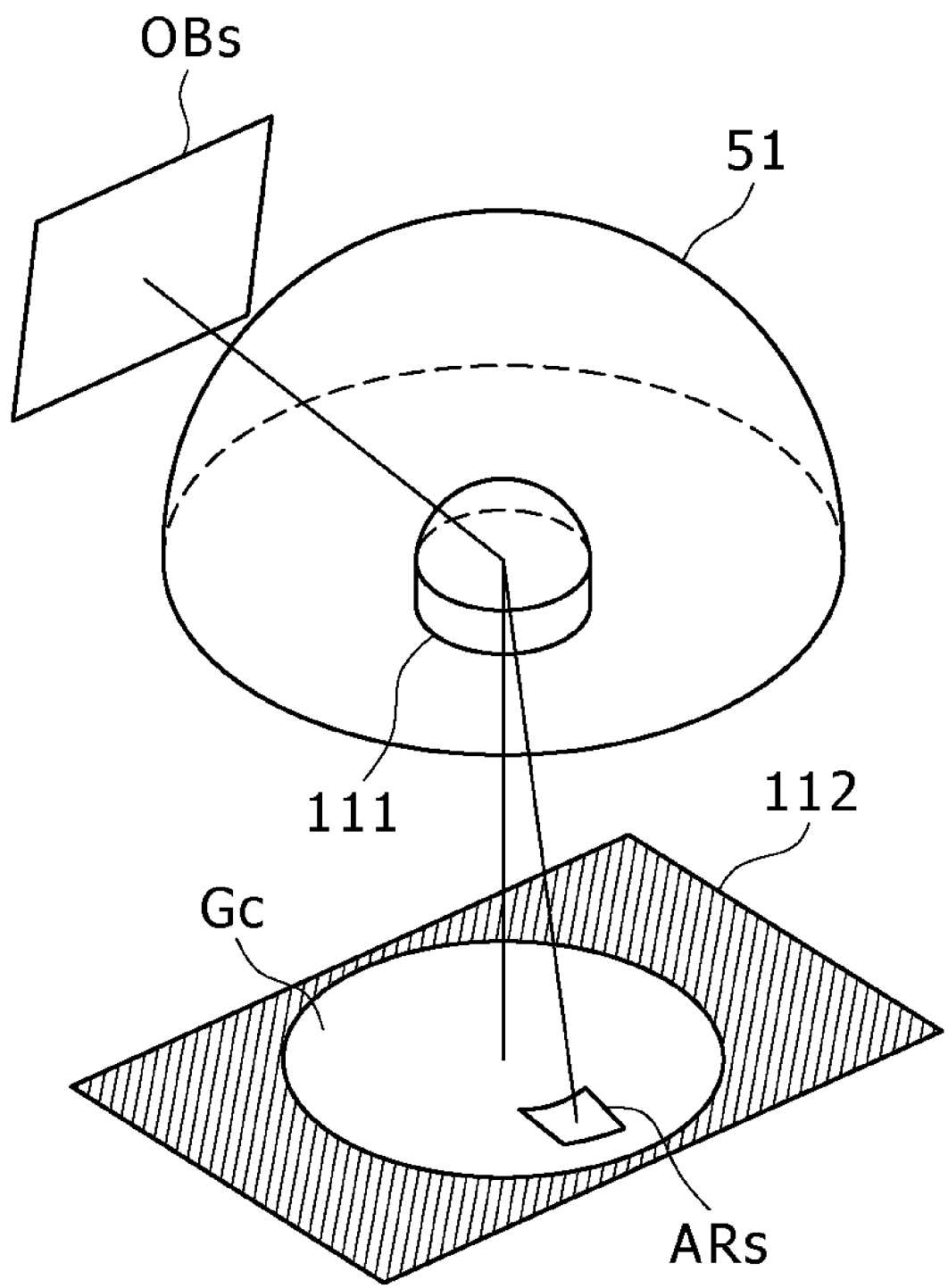
FIG. 2 is a view showing a subject image formed on an image capturing device.

If the image capturing optical system 111 comprises a fisheye lens or the like and the field of view thereof is represented as a semispherical field 51 as shown in FIG. 2, then an image signal generated by the image capturing device 112 represents a circular wide-field-of-view image Gc. An output area OBs which represents the field of view of the output image from the distortion correction processor 12 corresponds to an area ARs in the wide-field-of-view image Gc. The distortion correcting process is performed to map an image signal of the area ARs to pixel positions on the output screen in order to correct the image distortion.

Figure 3A:
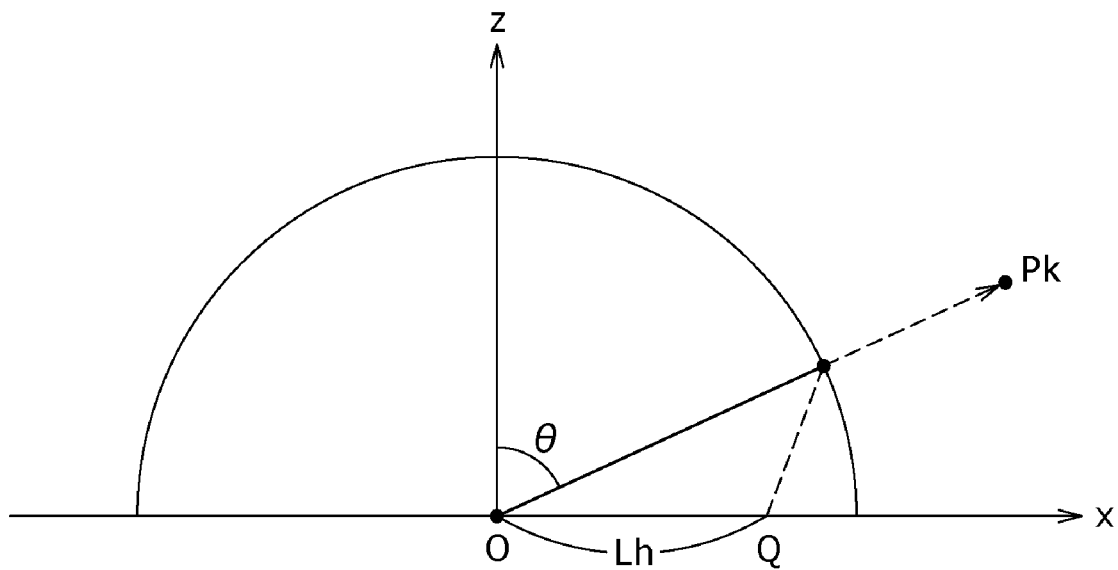
FIGS. 3A and 3B are diagrams showing image height characteristics of a lens.
Figure 3B:
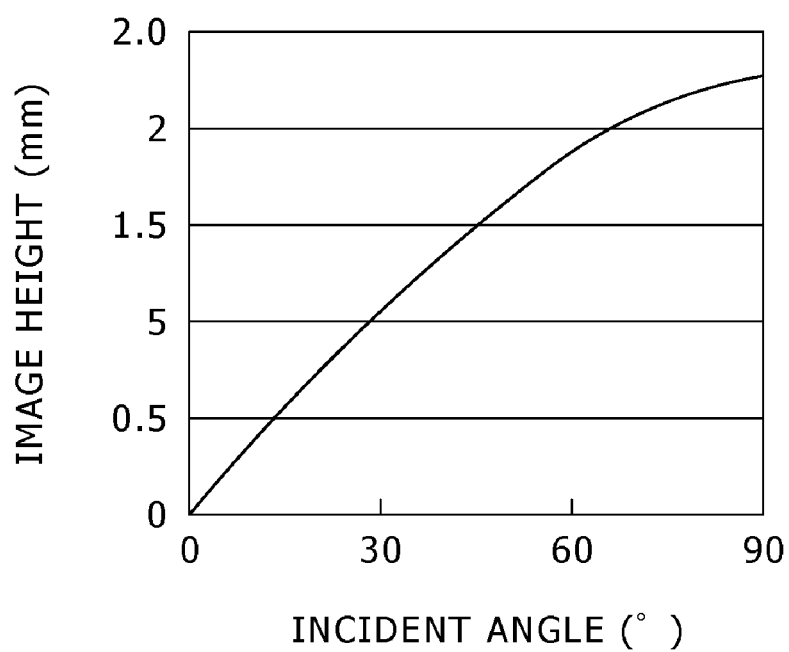

FIGS. 3A and 3B are diagrams showing image height characteristics of a lens. FIG. 3A shows a two-dimensional representation of an upper hemispherical field of view about a point O as viewed in the direction of the y-axis. In FIG. 3A, an arrow OPk indicates the direction of a subject. If a subject that is positioned in the direction indicated by the arrow OPk is focused at a focus point Q, then the distance from the point O to the focus point Q represents an image height Lh. FIG. 3B shows image height characteristics. In FIG. 3B, the horizontal axis indicates the angle (incident angle) θ and the vertical axis the image height Lh. The data shown in FIG. 3B may be stored as a conversion table in a memory.

Figure 4A:
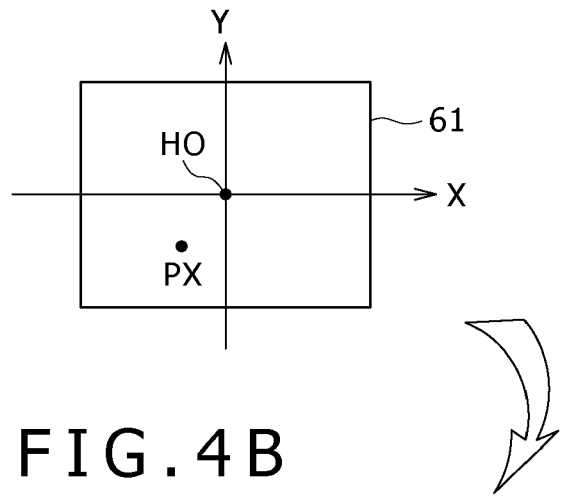
FIGS. 4A through 4D are diagrams illustrative of the principles of a distortion correcting process.
Figure 4B:
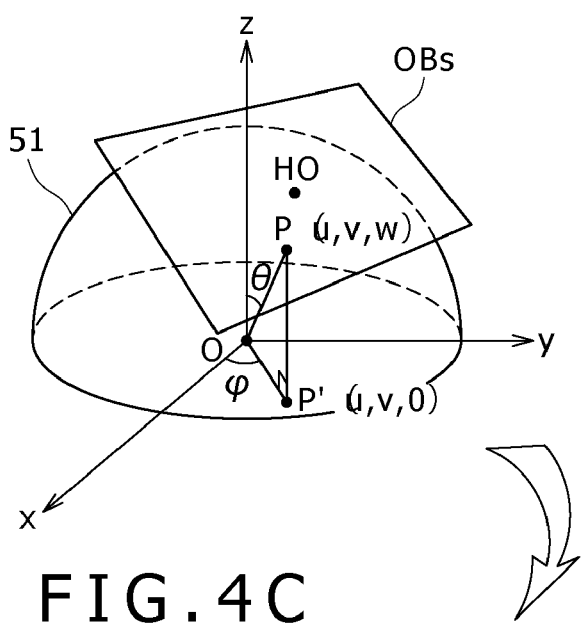
Figure 4C:
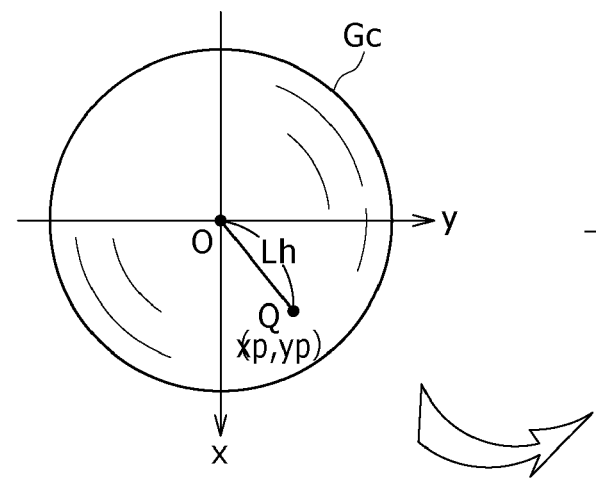

FIGS. 4A through 4D are diagrams illustrative of the principles of the distortion correcting process. FIG. 4A shows a displayed screen 61 of the image of the output area OBs which represents the field of view of the output image. FIG. 4B shows the output area OBs set against the semispherical field 51. The output area OBs corresponds to the displayed screen 61. For example, a point P on the output area OBs corresponds to a pixel position PX on the displayed screen 61. The output area OBs and the displayed screen 61 have a center HO. FIG. 4C shows the semispherical field 51 as projected onto an x-y plane. The area onto which the semispherical field 51 is projected corresponds to the area of the wide-field-of-view image Gc.

The point P, for example, on the output area OBs set against the semispherical field 51 will be described below. If the position of the point P is represented by P(u, v, w), then since $OP=(u^2+v^2+w^2)^{1/2}$, the angle θ can be determined as $\theta=\arccos[w/((u^2+v^2+w^2)^{1/2})]$. If the above image height characteristics are determined in advance with respect to the image capturing optical system 111 and the conversion table for conversion between the angle θ and the image height Lh is stored, then the image height Lh with respect to the point P can be obtained by calculating the angle θ.

If a line extending from the point P perpendicularly to the x-y plane intersects the x-y plane at a point P'(u, v, 0), then $OP'=OP\times\sin(\theta)$. Therefore, the focus point Q(xp, yp) is placed at a position indicated by $xp=u\times Lh/((u^2+v^2+w^2)^{1/2}\times\sin(\theta))$, $yp=v\times Lh/((u^2+v^2+w^2)^{1/2}\times\sin(\theta))$. The focus point Q(xp, yp) can be determined in this manner.

Alternatively, an angle φ between the direction of the point P' on the x-y plane, which corresponds to the point P, and the x-axis may be determined, and the position of the focus point Q may be determined from the angle φ and the image height Lh. The angle φ can be determined as $\phi=\arccos[u/((u^2+v^2)^{1/2})]$. Therefore, the focus point Q is determined as the position that is spaced from the point O by the image height Lh in the direction that is inclined to the x-axis by the angle φ.

Figure 4D:
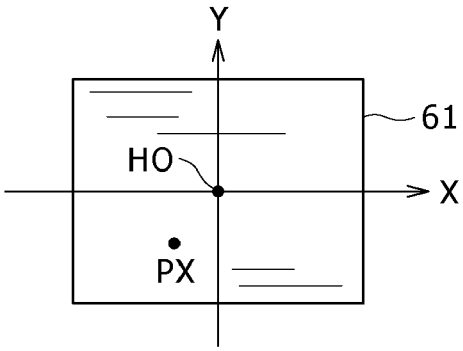

An image signal of the focus point Q thus determined is obtained from the image signal DVa. Based on the obtained image signal, a pixel position PX on the displayed screen 61 that corresponds to the point P on the output area OBs is plotted as shown in FIG. 4D. All pixel positions on the displayed screen 61 are similarly processed thereby to map pixel signals to the pixels of the displayed screen 61 while the distortion produced by the image capturing optical system 111 is being corrected. In the event that there is no pixel signal corresponding to the focus point Q, a pixel signal corresponding to the focus point Q may be created by using pixel signals of pixels around the focus point Q. For example, pixel signals of pixels around the focus point Q may be interpolated to generate a pixel signal corresponding to the focus point Q. In this manner, pixel signals of focus points Q that correspond to respective points on the display screen 61 are read from the input image buffer 121, and written in the output image buffer 123 to hold pixel signals of the pixels on the displayed screen 61. The image signal of a distortion-corrected image is thus stored in the output image buffer 123.

In the above distortion correcting process, it takes long calculation times if the pixel positions on the wide-field-of-view image that correspond to the respective pixels on the displayed screen 61, i.e., if the focus points Q that correspond to the respective pixels on the displayed screen 61, are calculated. The calculation times can be reduced by correcting the distortion with a lower image quality when an image of an unselected area is generated than when an image of a selected area is generated. For example, if the mapping process is performed at the interval of every other pixel or the interval of every plural of pixels in the unselected area, then the number of times that pixel positions are calculated is reduced, resulting in shorter calculation times.

Figure 5A:
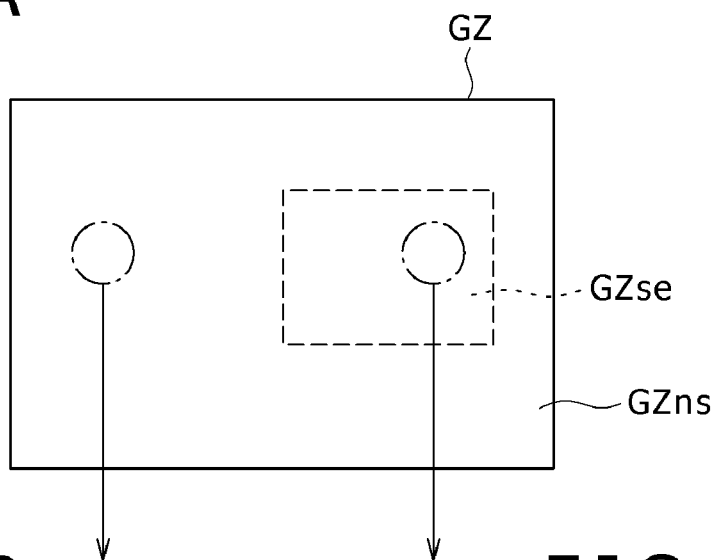
FIGS. 5A through 5D are diagrams illustrative of distortion correcting calculations for a selected area and an unselected area.
Figure 5B:
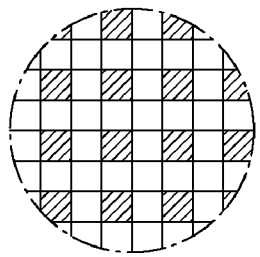

FIGS. 5A through 5D are diagrams illustrative of distortion correcting calculations for a selected area and an unselected area. FIG. 5A shows an output image GZ. The output image GZ contains a selected area GZse and a remaining area serving as an unselected area GZns. In the unselected area GZns, pixel positions on a wide-field-of-view image are calculated at the interval of every other pixel or the interval of every plural of pixels, as shown in FIG. 5B. In FIG. 5B, pixel positions on a wide-field-of-view image are calculated horizontally and vertically at the interval of every other pixel, i.e., at pixels shown hatched.

Figure 5D:
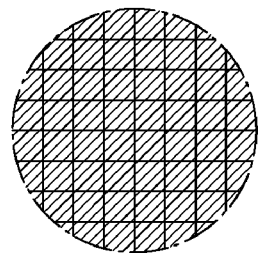
Figure 5C:
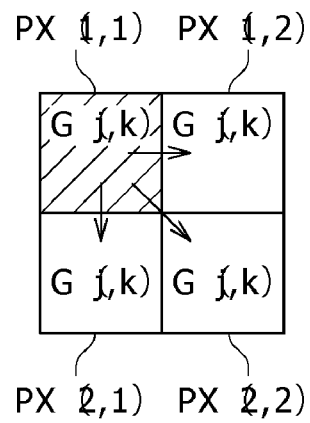

When pixel positions on a wide-field-of-view image are thus calculated at the interval of every other pixel or the interval of every plural of pixels, the number of times that pixel positions are calculated is reduced, resulting in shorter calculation times. Pixel signals of those pixels whose pixel positions are not calculated cannot be mapped. Accordingly, the pixel signals of those pixels whose pixel positions are calculated and which are mapped are used as pixel signals of those pixels whose pixel positions are not calculated. For example, when a pixel signal G(x, y) on the wide-field-of-view image is mapped as a pixel signal DP(1, 1) at a pixel position PX(1, 1), as shown in FIG. 5C, the pixel signal G(x, y) is copied for use as pixel signals DP(1, 2), DP(2, 1), DP(2, 2) at respective pixel positions PX(1, 2), PX(2, 1), PX(2, 2). In the selected area GZse, as shown in FIG. 5D, the pixel positions of all pixels on the wide-field-of-view image are calculated, and pixel signals thereof are mapped.

Since the calculation times can be shortened by the above process, it is possible to produce corrected image signals at a high frame rate. If the selected area GZse is selected so as to include a subject under attention, then the image quality of the subject under attention is prevented from being unduly lowered.

Furthermore, the distortion correcting process may be carried out while checking successive pixels to determine whether each pixel of an output image is a pixel in the selected area GZse or a pixel in the unselected area GZns. Alternatively, the distortion correcting process may be carried out on an overall output image that is provisionally set as the unselected area GZns and thereafter on pixels included in the selected area GZse that is set in the output image.

If the distortion correcting process is carried out on an overall output image that is provisionally set as the unselected area GZns and thereafter on pixels included in the selected area GZse that is set in the output image, then since it is not necessary to determine whether each pixel is a pixel in the selected area or a pixel in the unselected area, the distortion correcting process can be performed efficiently. If the distortion correcting process is carried out on only those pixels in the selected area GZse whose pixel positions on the wide-field-of-view image have not been calculated in the distortion correcting process carried out on the overall output image that is provisionally set as the unselected area GZns, then the distortion correcting process can also be performed efficiently because the distortion correcting process is not repeated on the same pixels.

Figure 6:
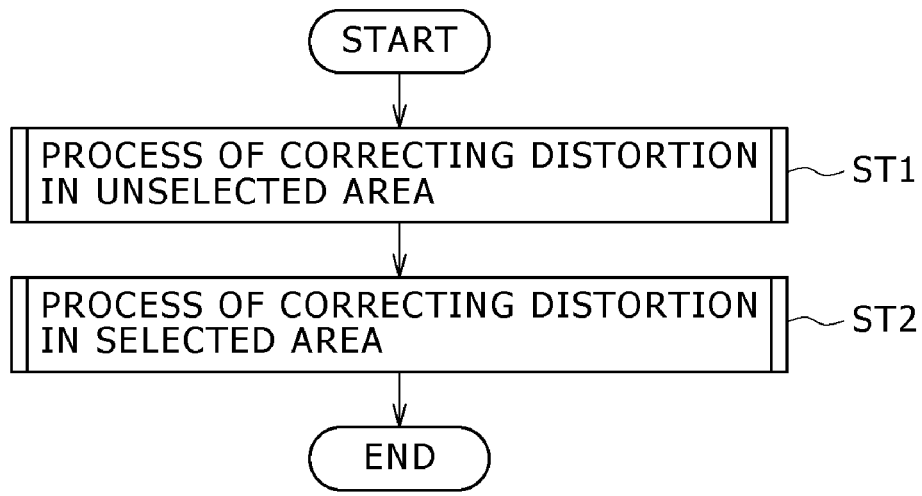
FIG. 6 is a flowchart of an overall operation sequence of the distortion correcting process.

The distortion correcting process will be described below with reference to flowcharts. FIG. 6 is a flowchart of an overall operation sequence of the distortion correcting process to be carried out on an overall output image that is provisionally set as an unselected area and thereafter on pixels included in a selected area that is set in the output image.

In step ST1 shown in FIG. 6, the distortion correcting process is carried out on an unselected area. Specifically, the distortion correcting process is carried out on the overall output image GZ that is provisionally set as the unselected area GZns, for example. Then, the distortion correcting process is carried out on the selected area GZse that is set in the output image GZ. Thereafter, the distortion correcting process is put to an end.

Figure 7:
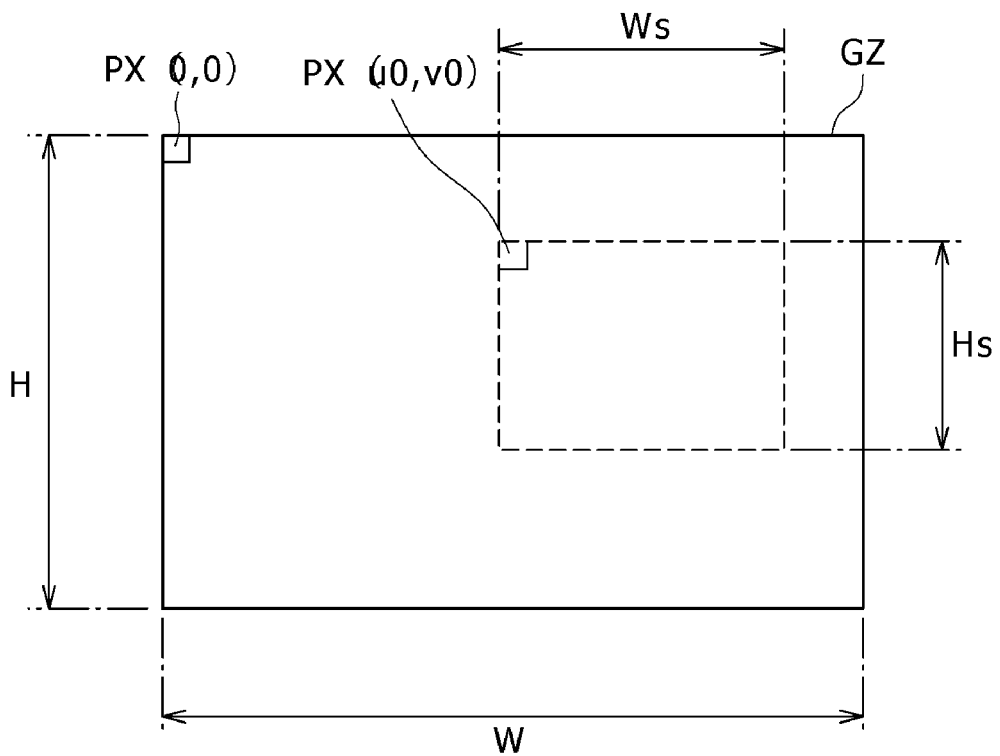
FIG. 7 is a diagram showing a selected area in an output image.

FIG. 7 shows a selected area set in an output image. Pixel positions on the output image are represented by PX(x, y), with the pixel on the upper left corner thereof being represented by PX(0, 0). The output image has a size defined by a horizontal width W and a vertical height H. The selected area GZse is of a rectangular shape, for example, with the pixel on the upper left corner thereof being represented by P(u0, v0). The selected area GZse has a size defined by a horizontal width Ws and a vertical height Hs.

Figure 8:
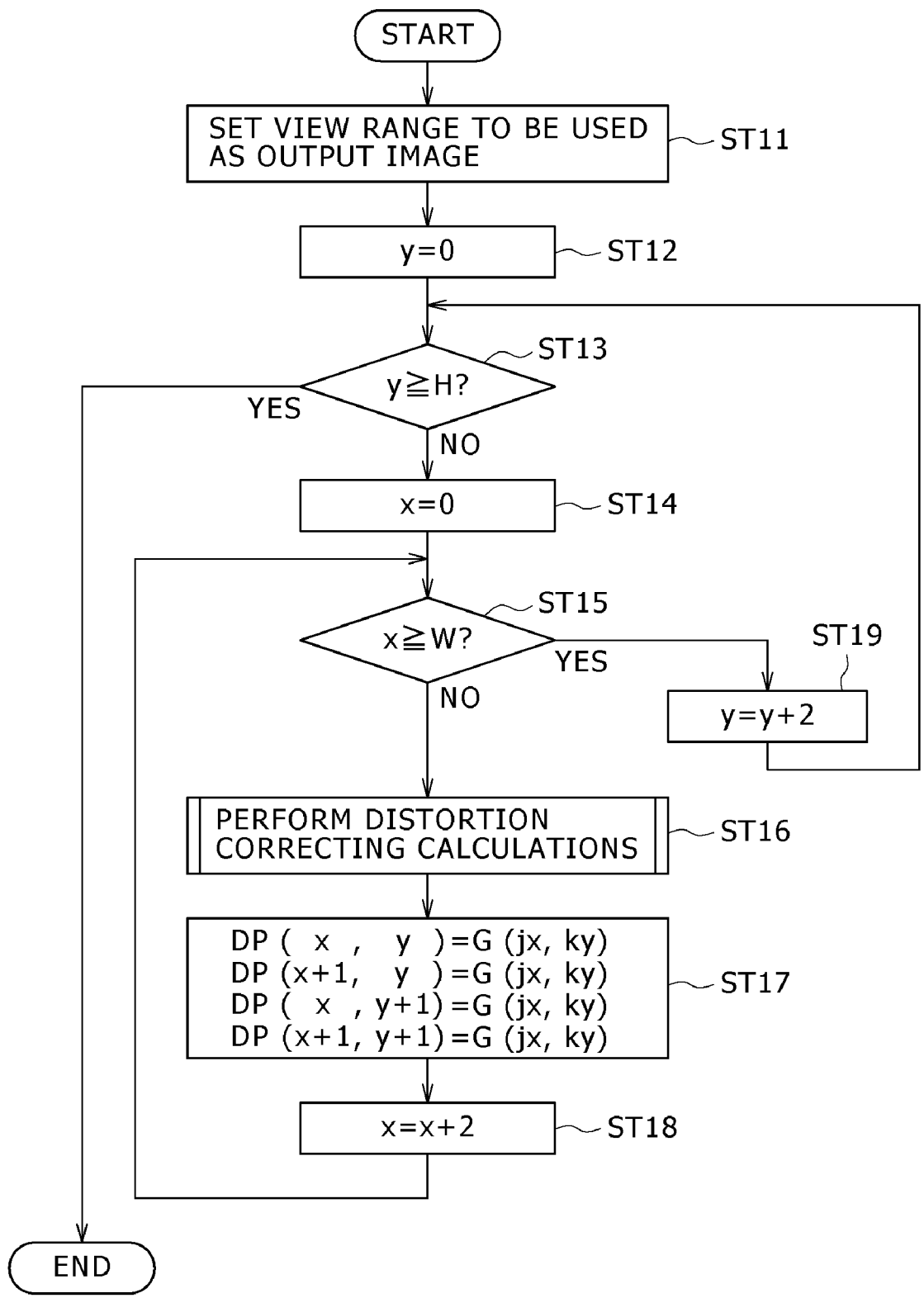
FIG. 8 is a flowchart of a distortion correcting sequence for an unselected area.

FIG. 8 is a flowchart of a distortion correcting sequence for an unselected area. In step ST11 shown in FIG. 8, the distortion correction calculator 122 sets a field of view to be established as an output image, i.e., the output area OBs. Then, control goes to step ST12.

In step ST12, the distortion correction calculator 122 initializes a variable y indicative of a vertical coordinate value to "y=0". Then, control goes to step ST13.

In step ST13, the distortion correction calculator 122 determines whether the distortion correcting process has been completed up to a vertical final pixel or not. If the value of the variable y has not reached the vertical height H, then control goes to step ST14.

In step ST14, the distortion correction calculator 122 initializes a variable x indicative of a vertical coordinate value to "y=0". Then, control goes to step ST15.

In step ST15, the distortion correction calculator 122 determines whether the distortion correcting process has been completed up to a horizontal final pixel or not. If the value of the variable x has not reached the horizontal height W, then control goes to step ST16.

In step ST16, the distortion correction calculator 122 carries out the distortion correcting process to calculate a pixel position on the wide-field-of-view image which corresponds to a pixel position PX(x, y) on the output image. Then, control goes to step ST17.

In step ST17, the distortion correction calculator 122 performs the mapping process for mapping pixel signals. Specifically, the distortion correction calculator 122 reads the pixel signal G(jx, jy) at the pixel position calculated in step S16 and sets it as a pixel signal DP(x, y) at the pixel position PX(x, y). The distortion correction calculator 122 then copies the read pixel signal G(jx, jy) for use as pixel signals of pixels whose pixel positions have not been calculated. Specifically, the distortion correction calculator 122 sets a pixel signal DP(x+1, y) at a pixel position P(x+1, y) to the pixel signal G(jx, jy), a pixel signal DP(x, y+1) at a pixel position P(x, y+1) to the pixel signal G(jx, jy), and a pixel signal DP(x+1, y+1) at a pixel position P(x+1, y+1) to the pixel signal G(jx, jy). Then, control goes to step ST18.

In step ST18, since the distortion correction calculator 122 calculates pixel positions at the interval of every other pixel, the distortion correction calculator 122 adds "2" to the variable x to produce a new value of the variable x. Then, control returns to step ST15.

The processing loop from step ST15 to step ST18 is repeated to perform the distortion correcting process progressively horizontally across the output image. When the distortion correcting process is completed along one line, the value of the variable x reaches the horizontal width W of the output image. Therefore, control goes from step ST15 to step ST19.

In step ST19, since the distortion correction calculator 122 calculates pixel positions at the interval of every other pixel, the distortion correction calculator 122 adds "2" to the variable y to produce a new value of the variable y. Then, control returns to step ST13. The processing loop from step ST13 to step ST19 is repeated to perform the distortion correcting process per one line progressively vertically across every other line. When the distortion correcting process is completed fully over the output image, the value of the variable y reaches the vertical height H of the output image. In step ST13, the value of the variable y is judged as having reached the vertical height H of the output image. The distortion correcting process in the unselected area is now put to an end.

Figure 9:
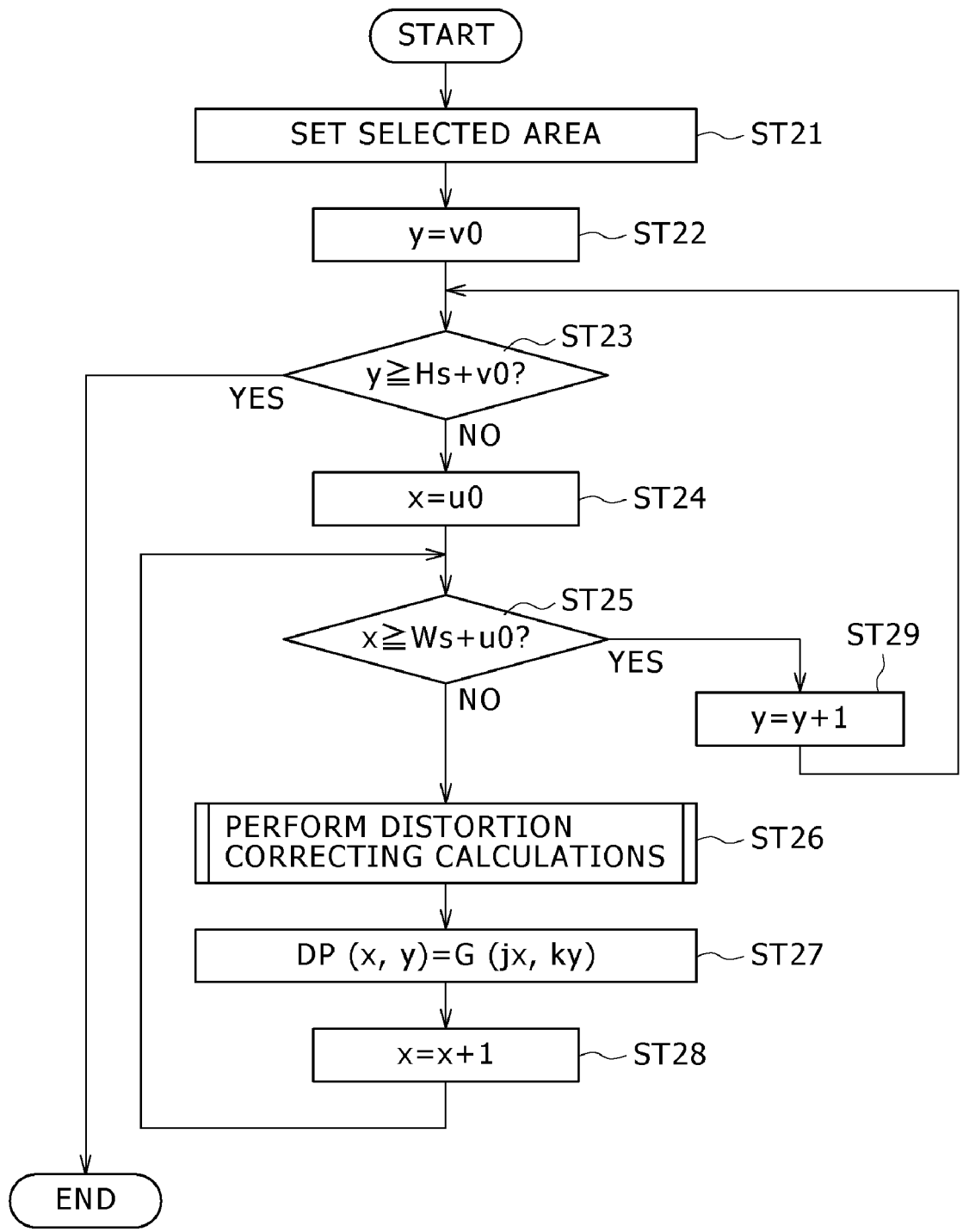
FIG. 9 is a flowchart of a distortion correcting sequence for a selected area.

FIG. 9 is a flowchart of a distortion correcting sequence for a selected area. In step ST21 shown in FIG. 9, the distortion correction calculator 122 sets a selected area. Then, control goes to step ST22.

In step ST22, the distortion correction calculator 122 sets the variable y which indicates a vertical coordinate value to a first pixel position "y=v0" in the selected area. Then, control goes to step ST23.

In step ST23, the distortion correction calculator 122 determines whether the distortion correcting process has reached a vertical final pixel in the selected area or not. If the value of the variable y has not reached the sum of the vertical pixel position v0 in the selected area and the height Hs of the selected area, then control goes to step ST24.

In step ST24, the distortion correction calculator 122 sets the variable x which indicates a horizontal coordinate value to a first pixel position "x=u0" in the selected area. Then, control goes to step ST25.

In step ST25, the distortion correction calculator 122 determines whether the distortion correcting process has reached a horizontal final pixel in the selected area or not. If the value of the variable x has not reached the sum of the horizontal pixel position u0 in the selected area and the width Ws of the selected area, then control goes to step ST26.

In step ST26, the distortion correction calculator 122 carries out the distortion correcting process to calculate a pixel position on the wide-field-of-view image which corresponds to a pixel position PX(x, y) on the output image. Then, control goes to step ST27.

In step ST27, the distortion correction calculator 122 performs the mapping process for mapping pixel signals. Specifically, the distortion correction calculator 122 reads the pixel signal G(jx, jy) at the pixel position calculated in step S26 and sets it as a pixel signal DP(x, y) at the pixel position PX(x, y). Then, control goes to step ST28.

In step ST28, since the distortion correction calculator 122 calculates all pixel positions in the selected area, the distortion correction calculator 122 adds "1" to the variable x to produce a new value of the variable x. Then, control returns to step ST25.

The processing loop from step ST25 to step ST28 is repeated to perform the distortion correcting process progressively horizontally across the selected area. When the distortion correcting process is completed along one line in the selected area, the value of the variable x reaches the value "Ws+u0". Therefore, control goes from step ST25 to step ST29.

In step ST29, since the distortion correction calculator 122 calculates all pixel positions in the selected area, the distortion correction calculator 122 adds "1" to the variable y to produce a new value of the variable y. Then, control returns to step ST23. The processing loop from step ST23 to step ST29 is repeated to perform the distortion correcting process per one line progressively vertically across each line. When the distortion correcting process is completed fully in the selected area, the value of the variable y reaches the value "Hs+v0". In step ST23, the value of the variable y is judged as having reached the value "Hs+v0". The distortion correcting process in the selected area is now put to an end.

Figure 10:
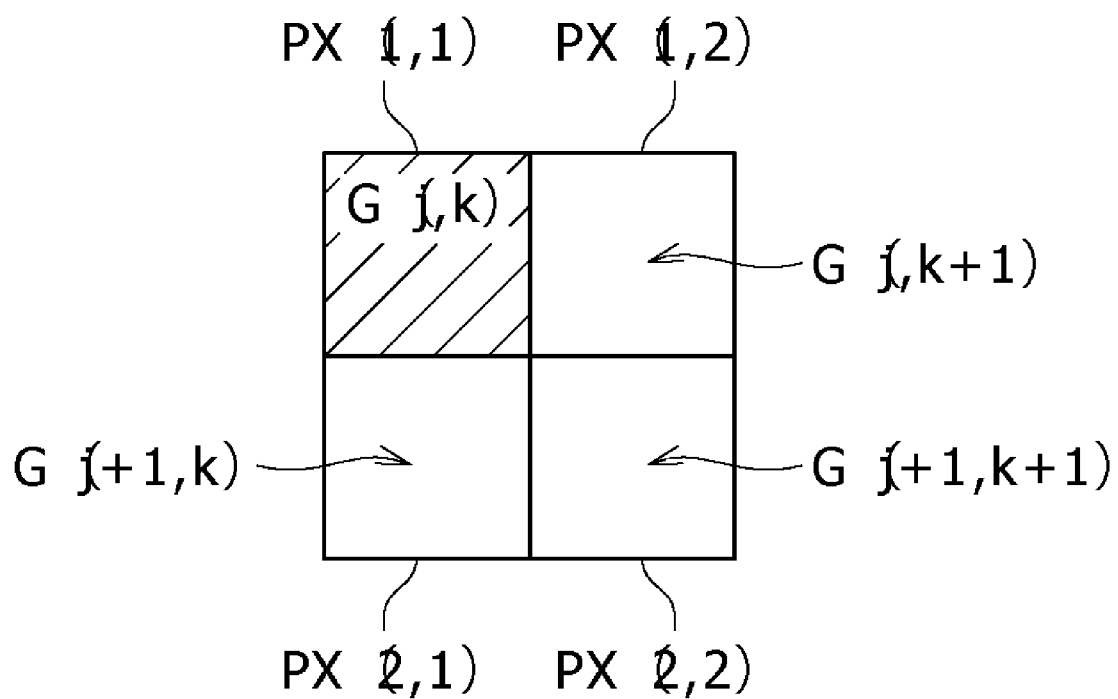
FIG. 10 is a diagram illustrative of another distortion correcting sequence for an unselected area.

According to the above distortion correcting process for the unselected area, as shown in FIG. 5C, the pixel signal of the pixel whose pixel position is calculated and which is mapped is used as the pixel signals of the pixels whose pixel positions are not calculated. However, when one pixel signal is copied to three pixels, the image of the unselected area is made up of units of four pixels, and may possibly be of a degraded image quality depending on the subject that is imaged. FIG. 10 shows a distortion correcting process for solving such a problem. According to the distortion correcting process shown in FIG. 10, a pixel signal of a pixel that is disposed adjacent to a pixel whose pixel signal is read from the wide-field-of-view image based on the results of the distortion correcting process is read for use as an image signal of a pixel whose pixel position is not calculated. For example, when the distortion correcting process is performed on a pixel having a pixel position PX(1, 1) and a pixel signal G(j, k) is read from the calculated pixel position in the wide-field-of-view image, a pixel signal G(j, k+1) at a pixel position which is disposed circumferentially adjacent to the pixel position in the wide-field-of-view image that corresponds to the pixel position PX(1, 1) is used as a pixel signal at a pixel position PX(1, 2) that is disposed rightwardly adjacent to the pixel position PX(1, 1). A pixel signal G(j+1, k) at a pixel position which is disposed radially adjacent to the pixel position in the wide-field-of-view image that corresponds to the pixel position PX(1, 1) is used as a pixel signal at a pixel position PX(2, 1) that is disposed downwardly adjacent to the pixel position PX(1, 1). Similarly, a pixel signal G(j+1, k+1) at a pixel position which is disposed diagonally adjacent to the pixel position in the wide-field-of-view image that corresponds to the pixel position PX(1, 1) is used as a pixel signal at a pixel position PX(2, 2) that is disposed rightwardly and downwardly adjacent to the pixel position PX(1, 1).

Figure 11:
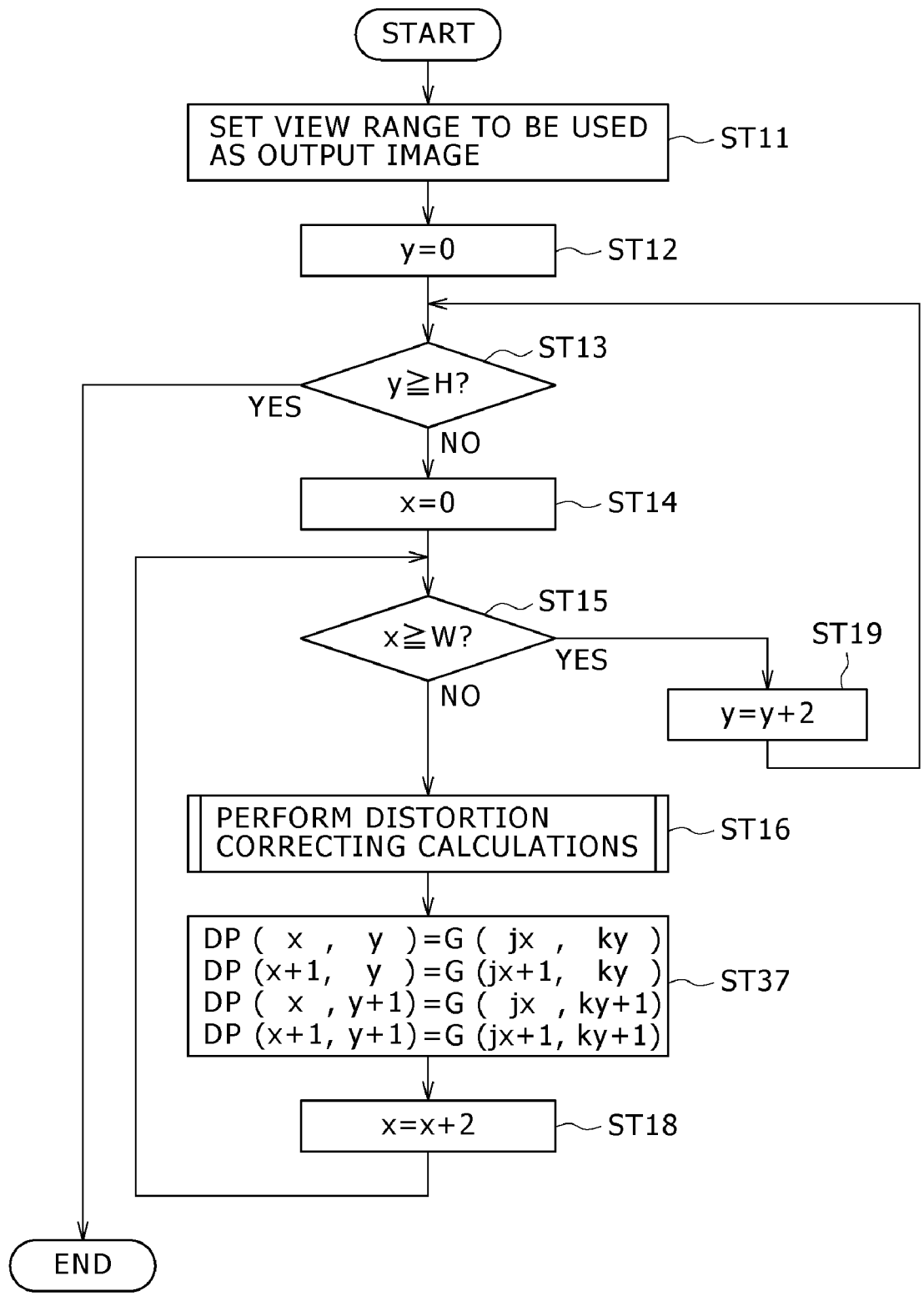
FIG. 11 is a flowchart of the other distortion correcting sequence for an unselected area.

FIG. 11 is a flowchart of a distortion correcting sequence for an unselected area, which uses pixel signals from adjacent pixels according to the distortion correcting process shown in FIG. 10. Those steps shown in FIG. 11 which are identical to those shown in FIG. 8 are denoted by identical step numbers, and will not be described in detail below.

In step ST37 shown in FIG. 11, the distortion correction calculator 122 performs the mapping process for mapping pixel signals. Specifically, the distortion correction calculator 122 reads the pixel signal G(jx, jy) at the pixel position calculated in step S16 and sets it as a pixel signal DP(x, y) at the pixel position PX(x, y). The distortion correction calculator 122 then reads pixel signals from pixels that are disposed adjacent to the pixel position from which the pixel signal G(jx, jy) is read, and uses the read pixel signals as pixel signals at pixels that are not calculated. Specifically, the distortion correction calculator 122 uses a pixel signal DP(jx+1, ky) read from an adjacent pixel as a pixel signal DP(x+1, y) at a pixel position PX(x+1, y), a pixel signal DP(jx, ky+1) read from an adjacent pixel as a pixel signal DP(x, y+1) at a pixel position PX(x, y+1), and a pixel signal DP(jx+1, ky+1) read from an adjacent pixel as a pixel signal DP(x+1, y+1) at a pixel position PX(x+1, y+1). Then, control goes to step ST18.

According to the distortion correcting process shown in FIGS. 10 and 11, the amount of information of the image in the unselected area is made greater than if the pixel signal is copied as shown in FIG. 5C, without increasing the amount of calculation performed in the distortion correcting process. Therefore, the quality of the image in the unselected area is better than if the pixel signal is copied.

If the interval between pixels whose pixel positions are calculated is greater as they are more spaced from the selected area, then since the number of times that the pixel positions are calculated is further reduced, the time required to perform the distortion correcting process is further shortened. Any deterioration of the image quality is lower in regions close to the selected area. Accordingly, the boundary between the selected area and the unselected area is less conspicuous, and the quality of the output image is prevented from being unduly lowered.

In the above embodiments, the pixel positions of all pixels in the selected area are calculated on the wide-field-of-view image, and the pixel positions of pixels at the interval of every other pixel or the interval of every plural pixels in the unselected area are calculated on the wide-field-of-view image. However, the pixel positions of pixels at the interval of every other pixel or the interval of every plural pixels in the selected area may be calculated on the wide-field-of-view image. In this case, the pixel positions of pixels are calculated on the wide-field-of-view image at a wider pixel-to-pixel interval in the unselected area than in the selected area.

The distortion correction processor 12 is not limited to the processing of the image signal DVa produced by the image capturing unit 11, but may be applied the correction of distortions of image signals stored in a memory.

Figure 12:
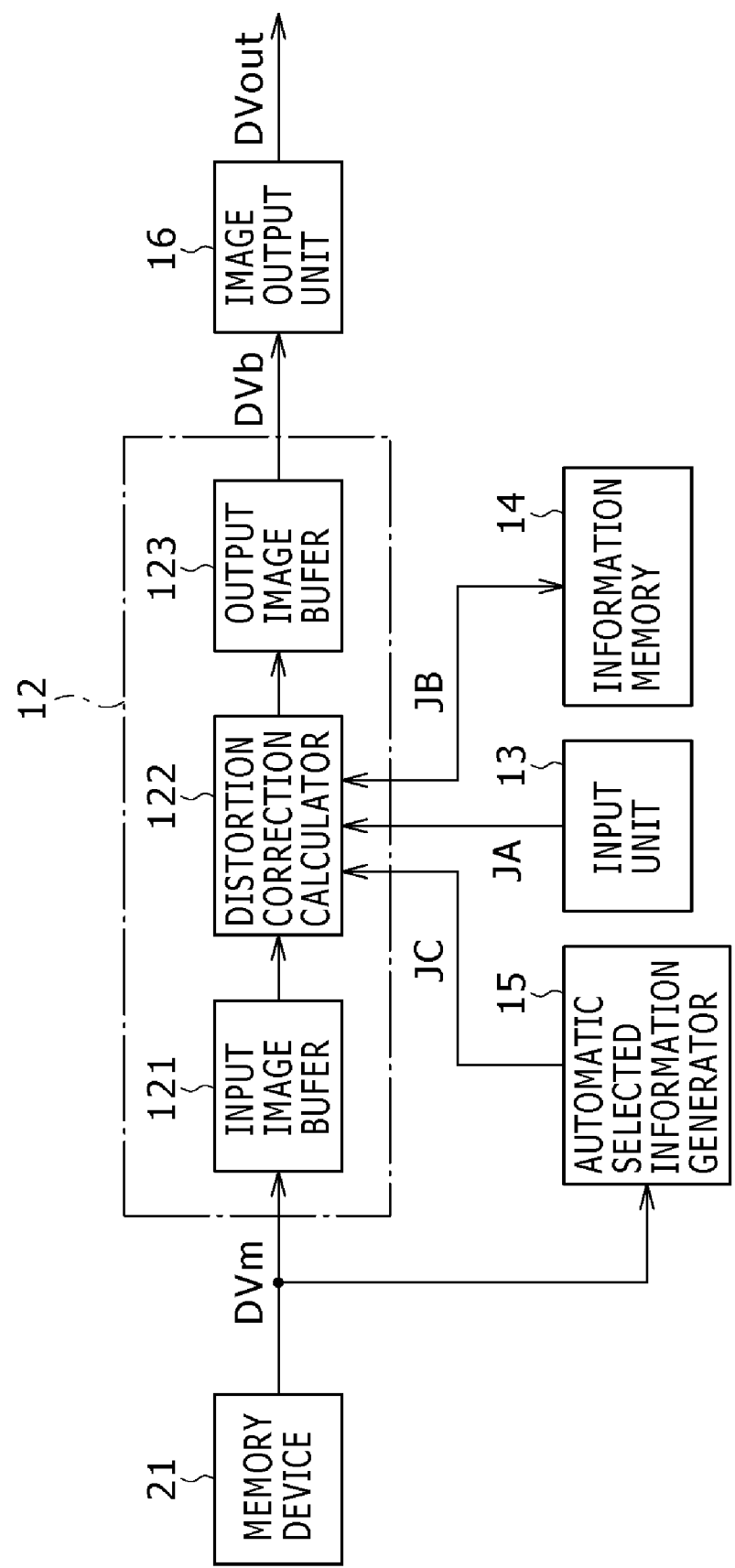
FIG. 12 is a block diagram of an image processing system.

FIG. 12 shows in block form an image processing system according to another embodiment of the present invention. The image processing system shown in FIG. 12 is devoid of the image capturing unit 11, and includes a memory 21. The memory 21 stores a wide-field-of-view image, for example, therein. The distortion correction processor 12 reads an image signal DVm from the memory 21 and performs the above distortion correcting process on the image signal DVm. The distortion correction processor 12 is thus capable of generating a distortion-corrected output image at a high frame rate while reducing the amount of calculation required to generate the output image.

As described above, the distortion correction processor 12 corrects a distortion with a lower image quality when an image of an unselected area is generated than when an image of a selected area is generated, at the time the distortion correction processor 12 generates a distortion-corrected output image from a distorted image in a wide field of view. Consequently, the amount of calculation required to generate an output image is reduced, and the output image can be generated at a high frame rate. As the amount of calculation required to generate an output image is reduced, the distortion correction processor 12 consumes a reduced amount of electric power.

When the distortion correction processor 12 generates an output image in an unselected area, the distortion correction processor 12 is capable of switching between a first operation mode for correcting a distortion with a lower image quality than when an output image of a selected area is generated and a second operation mode for correcting a distortion without a lower image quality. If the distortion correction processor 12 is set to the first operation mode, it can produce a distortion-corrected output image at a high frame rate, and if the distortion correction processor 12 is set to the second operation mode, it can produce an output image having an overall high image quality. The image processing apparatus according to the present invention is thus capable of performing the distortion correcting process with high level of freedom.

Not only the distortion-corrected output image may be displayed, but also the wide-field-of-view image may be displayed in combination with the output image such that the output image can be distinguished from the wide-field-of-view image. In this manner, it is easy for the viewer to determine which area of the wide-field-of-view image is distortion-corrected and output as the distortion-corrected output image. If the selected area is also distinguishable in the wide-field-of-view image, then it is also possible for the viewer to confirm how the selected area is provided in the output image.

Figure 13:
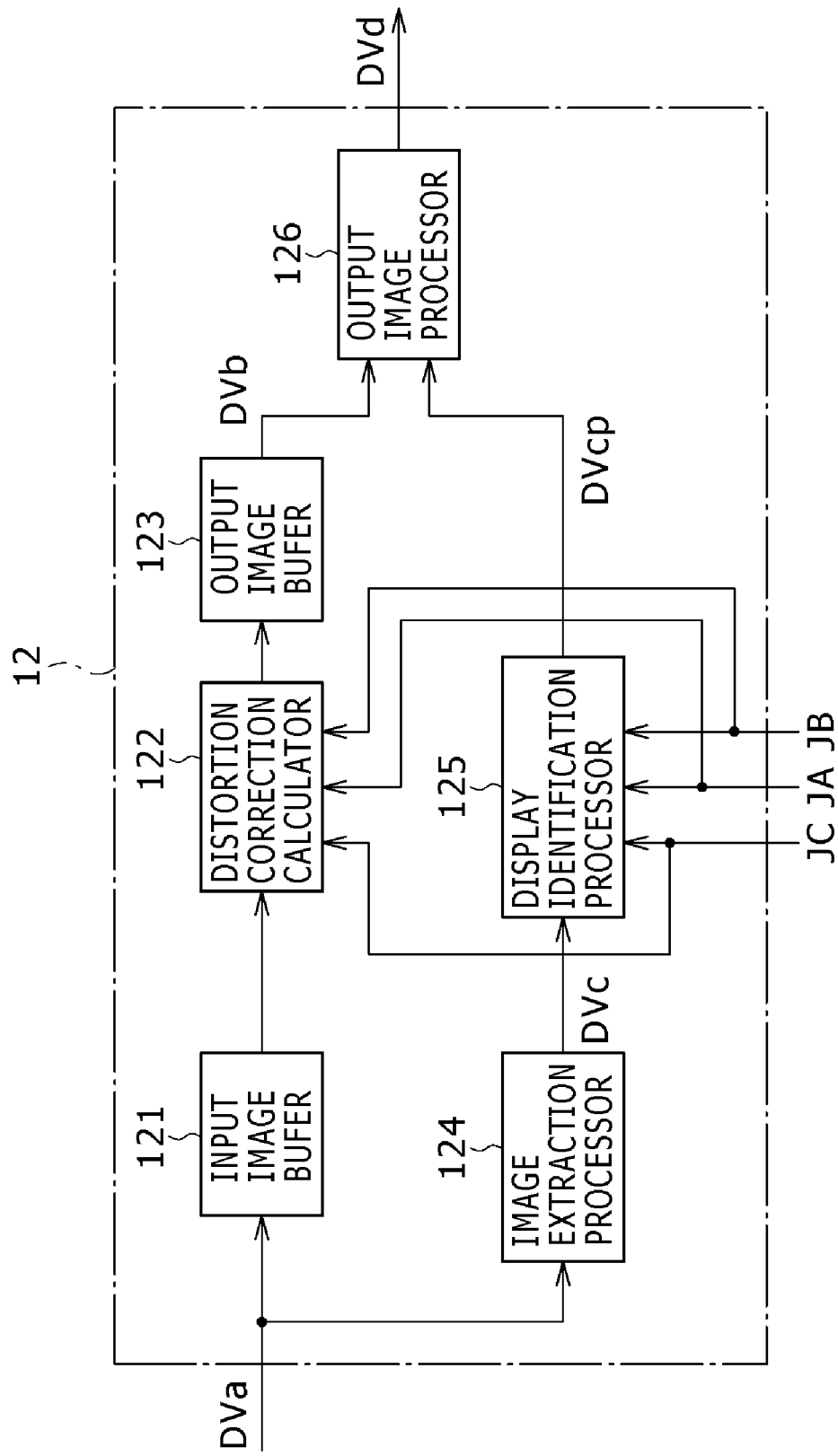
FIG. 13 is a block diagram of another image processor.

FIG. 13 shows in block form another image processor for outputting a wide-field-of-view image in combination with an output image. Those parts shown in FIG. 13 which are identical to those shown in FIG. 1 are denoted by identical reference characters, and will not be described in detail below.

As shown in FIG. 13, a image extraction processor 124 extracts an image signal DVc in a wide-field-of-view image Gc from an image signal DVa, and supplies the image signal DVc to a display identification processor 125. As shown in FIG. 2, the wide-field-of-view image Gc represents a partial area of the image capturing surface of the image capturing device 112, and is determined by the image capturing optical system 111. If the area of the wide-field-of-view image Gc is fixed on the image capturing surface, then when pixel signals at given pixel positions are extracted from the image signal DVa, the pixel signals of the area of the wide-field-of-view image Gc can be produced. If the image capturing optical system 111 is replaceable and hence the area of the wide-field-of-view image Gc is variable on the image capturing surface, or if the optical characteristics of the image capturing optical system 111 can be changed and hence the area of the wide-field-of-view image Gc is variable on the image capturing surface, then the area of the wide-field-of-view image Gc on the image capturing surface is determined in advance, and the pixel signals are extracted from the determined area of the wide-field-of-view image Gc. The area of the wide-field-of-view image Gc can easily be determined by capturing an image such that the field of view of the image capturing optical system 111 is fully occupied by a white subject, and detecting pixel positions where the image signal DVa is of the white level.

The display identification processor 125 processes the area ARs corresponding to the field of view of the output image indicated by the setting information JA, JB so that the user can easily identify the area ARs, based on the setting information JA that is supplied from the input unit 13 and the setting information JB that is read from the memory 14. For example, the display identification processor 125 displays a boundary between the area ARs and an area exclusive of the area ARs or changes the luminance or color of an area exclusive of the area ARs to make the area ARs visually distinguishable. The display identification processor 125 also processes an area ARse on the output image GZ, which corresponds to the selected area GZse indicated by the setting information JA, JB and the setting information JC supplied from the automatic selected information generator 15, so that the user can easily identify the area ARse as with the area ARs. Based on the above image processing process, the display identification processor 125 generates an image signal DVcp of an image (hereinafter referred to as "overall image Gcp") wherein the area ARs and the area ARse are distinguishable in the wide-field-of-view image Gc, and supplies the image signal DVcp to an output image processor 126. The display identification processor 125 may selectively perform the process of distinguishing the area ARs and the process of distinguishing the area ARse based on the setting information JA, JB, JC, such that the areas ARs, ARse can distinguishably be displayed as desired.

The output image processor 126 generates an image signal DVd of an image which comprises a distortion-corrected output image with the overall image Gcp incorporated therein, based on the image signal DVb read from the output image buffer 123 and the image signal DVcp supplied from the display identification processor 125, and supplies the image signal DVd to the image output unit 16.

Figure 14A:
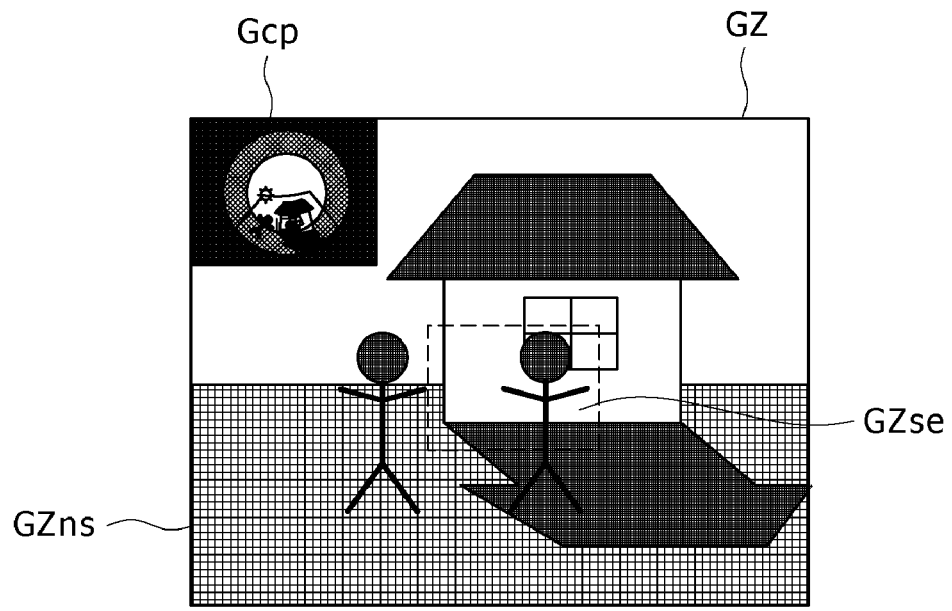
FIGS. 14A and 14B are diagrams showing an output image including an overall image.
Figure 14B:
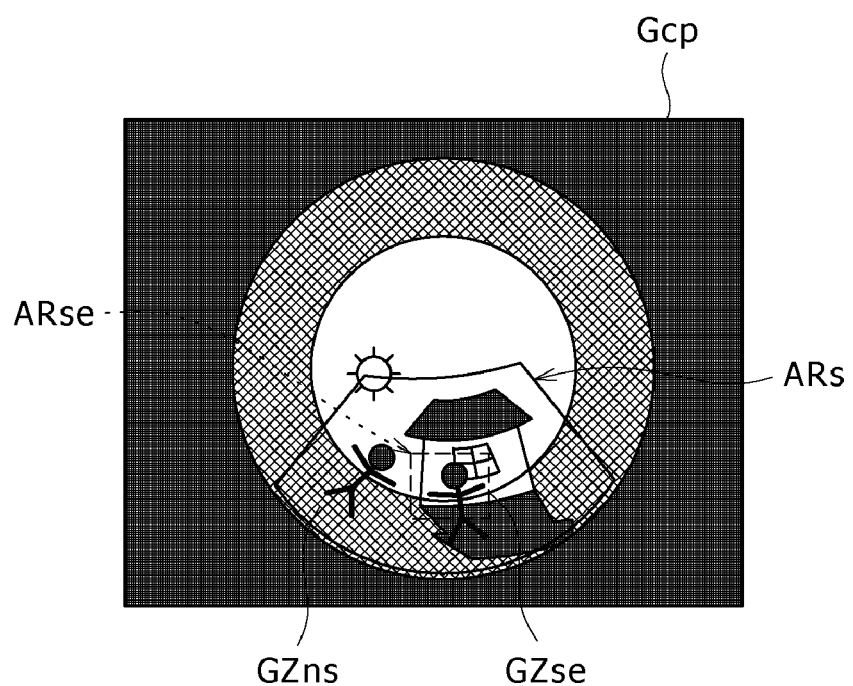

FIGS. 14A and 14B show the displayed output image GZ with the overall image Gcp incorporated therein. FIG. 14A shows the output image GZ, and FIG. 14 shows the overall image Gcp at an enlarged scale.

The overall image Gcp is displayed such that the area of the output image GZ and the selected area GZse in the output image GZ are visually distinguishable. For example, these areas are displayed as frames or displayed in different luminance levels, colors, etc. When the overall image Gcp is displayed in this manner, the viewer finds it easy to determine which area of the overall image Gcp serves as the area of the output area GZ and also to determine which area of the output image GZ serves as the selected area GZse. If the areas are defined such that a desired subject in the overall image Gcp is included in the output image GZ and the selected area GZse, then the image quality of the subject is prevented from being lowered and a distortion-corrected image signal can be produced at a high frame rate.

When the selected area GZse is automatically set, the selected area GZse may be made distinguishably displayed for the viewer to confirm whether the selected area is set and the distortion is corrected so as not to lower the image quality of a desired subject.

Although certain preferred embodiments of the present invention have been shown and described in detail, it should be understood that various changes and modifications may be made therein without departing from the scope of the appended claims.

What is claimed is:

1. An image processing apparatus comprising:
   a distortion correction processor configured to generate a distortion-corrected output image from a distorted wide-field-of-view image; and
   a selected area setting unit configured to set a selected area in said output image;
   wherein said distortion correction processor is configured to correct a distortion with a lower image quality when an output image of an area excluding said selected area is generated than when an output image of said selected area is generated.

2. The image processing apparatus according to claim 1, wherein said selected area setting unit is configured to compare wide-field-of-view images in a plurality of frames with each other and automatically set said selected area based on results of comparison between the wide-field-of-view images.

3. The image processing apparatus according to claim 1, wherein said distortion correction processor is configured to correct a distortion on the output image by provisionally setting the output image in its entirety as the area excluding said selected area, and thereafter generate the output image of said selected area.

4. The image processing apparatus according to claim 1, wherein said distortion correction processor is configured to (a) calculate pixel positions in the wide-field-of-view image which correspond to pixels in said output image at the interval of every other pixel or the interval of every plural pixels when correcting the distortion with the lower image quality, and (b) perform a mapping process in which pixel signals at the calculated positions are used as signals for corresponding pixels in said output image, thereby generating the distortion-corrected output image from the distorted wide-field-of-view image.

5. The image processing apparatus according to claim 4, wherein said distortion correction processor is configured to use the pixel signals of the pixels, which are processed by said mapping process, as pixel signals of pixels, which are not processed by said mapping process.

6. The image processing apparatus according to claim 4, wherein said distortion correction processor is configured to use pixel signals of pixels, which are disposed adjacent to the pixels in the wide-field-of-view image from which the pixel signals are read by said mapping process, as pixel signals of pixels, which are not processed by said mapping process.

7. The image processing apparatus according to claim 1, wherein said distortion correction processor is switchable between a first operation mode for correcting a distortion with a lower image quality than when the output image of said selected area is generated and a second operation mode for correcting a distortion without a lower image quality.

8. A method of processing an image, comprising the steps of:
   generating a distortion-corrected output image from a distorted wide-field-of-view image; and
   setting a selected area in said output image;
   wherein said step of generating the distortion-corrected output image includes the step of correcting a distortion with a lower image quality when an output image of an area excluding said selected area is generated than when an output image of said selected area is generated.

* * * * *